United States Patent [19]

Shimada et al.

[11] 4,161,645
[45] Jul. 17, 1979

[54] ARC WELDING APPARATUS AND METHOD

[75] Inventors: Wataru Shimada; Seigo Hiramoto, both of Amagasaki, Japan

[73] Assignee: Mitsubishi Denki Kabushiki Kaisha, Tokyo, Japan

[21] Appl. No.: 713,032

[22] Filed: Aug. 10, 1976

Related U.S. Application Data

[63] Continuation of Ser. No. 534,186, Dec. 19, 1974, abandoned.

[30] Foreign Application Priority Data

Dec. 19, 1973 [JP] Japan .................................. 48/143176

[51] Int. Cl.$^2$ .............................................. B23K 9/16
[52] U.S. Cl. .................................... 219/137 R; 219/75
[58] Field of Search ...... 219/74, 75, 137 R, 137 WM, 219/121 P

[56] References Cited

U.S. PATENT DOCUMENTS

| | | | |
|---|---|---|---|
| 2,824,948 | 2/1958 | van der Willigen et al. | 219/74 |
| 2,862,294 | 12/1958 | Philip | 219/137 R |
| 3,149,222 | 9/1964 | Giannini et al. | 219/75 |
| 3,249,736 | 5/1966 | Kobayashi | 219/137 WM |
| 3,349,215 | 10/1967 | Wagenleitner et al. | 219/74 |
| 3,575,568 | 4/1971 | Tateno | 219/121 P |
| 3,612,807 | 10/1971 | Liefkens et al. | 219/121 P |
| 3,692,973 | 9/1972 | Oku et al. | 219/75 |
| 3,818,175 | 6/1974 | Essers et al. | 219/121 P |
| 3,891,824 | 6/1975 | Essers et al. | 219/121 P |

Primary Examiner—Bruce A. Reynolds
Assistant Examiner—Clifford C. Shaw
Attorney, Agent, or Firm—Oblon, Fisher, Spivak, McClelland & Maier

[57] ABSTRACT

An arc welding apparatus and method is described which includes a guide nozzle surrounding a non-consumable electrode and a shielding nozzle disposed outside the guide nozzle so as to feed a protecting inert gas about the electrode from a position within the guide nozzle and to feed a shielding carbon dioxide gas or a mixture of carbon dioxide gas and oxygen or other inert gas from a position within the shielding nozzle, whereby the electrode is protected by means of the guide nozzle and the protecting gas supplied therethrough and the outer portion of the arc is cooled to restrict the radial extent thereof by the shielding gas, while a deoxidizing reaction with the melted metal may be performed by means of the carbon dioxide gas and a deoxidizing agent within a welding rod when the latter is employed between the electrode and a base metal, or in the vicinity of the welding arc.

8 Claims, 13 Drawing Figures (a)   (b)

CONTENT OF CARBON DIOXIDE GAS WITHIN SHIELDING GAS (a) PRIOR ART  (b)

(a)  (b)

ARC WELDING APPARATUS AND METHOD

This is a continuation, of application Ser. No. 534,186, filed Dec. 19, 1974, now abandoned.

BACKGROUND OF THE INVENTION

1. Field of the Invention

The present invention relates generally to an arc welding apparatus and method and more particularly to an arc welding apparatus and method which can be continuously used or employed for a long period of time so as to automatically arc weld steel substrates or the like.

2. Description of the Prior Art

In theory, it is unnecessary to have an observe welding apparatus from the beginning of the welding operation to the completion of the automatic arc welding operation; however, in an actual arc welding operation, it is usually necessary to observe and repair the welding apparatus, especially the welding torch thereof, as a result of the occurrence of undesirable phenomena, such as, for example, a consumpution of the electrode and the deposition of spatter. Accordingly, a substantial amount of labor and time have been spent in conjunction with such operations.

The present invention is contructed so as to provide welding apparatus for imparting stable welding throughout the entire welding operation without the necessity of repairing the welding torch. The disadvantages of conventional arc welding methods will be apparent from FIG. 1 which is a schematic view of a torch of a conventional carbon arc are welding apparatus wherein, in accordance with well-known welding methods, economical carbon dioxide gas or a mixture of carbon dioxide gas and oxygen is utilized as a shielding gas. (Hereinafter, carbon dioxide gas and a mixture of carbon dioxide gas and oxygen are referred to simply as carbon dioxide gas.)

Within FIG. 1, power is supplied to a welding flux rod 1 through means of a contact chip 2 so as to ignite an arc 4 between the rod and a substrate or base metal 3 and to form a pool of melted metal 5. In order to prevent permeation of atmospheric nitrogen into the molten pool 5, a shielding gas 7 is fed from a shielding nozzle 6 so as to protect the molten pool 5. Within such a carbon dioxide arc welding method, economical carbon dioxide gas is used as the shielding gas and the welding rod 1 contains a large amount of silicon (Si) and manganese (Mn) as a deoxidizing agent for removing oxygen contained within the molten pool 5.

Accordingly, within the welding process, the reaction of the deoxidizing agent such as, for example, silicon and manganese, with the oxygen of the steel substrate or base metal is performed within the pool of melted metal so as to result in the formation of slag of $SiO_2$, $MnO$ and the like which floats upon the pool of melted metal. The remaining deoxidizing agent which does not react with the oxygen of the steel substrate reacts with the oxygen produced by means of dissociation from the carbon dioxide and such also floats as a slag, this being a fundamental principle of carbon dioxide arc welding methods.

Within the welding operation, a large amount of spatter is also formed, as shown in FIG. 2, a part of the melted metal 8 at the end of the welding rod being scattered out of the arc 4 in the form of fine drops 9 without travelling to the base metal 3, as shown within FIG. 2a, and such is also deposited upon the end of the contact chip 2, as well as upon the end of the shielding nozzle 6 of FIG. 1, so as to prevent the welding operation from continuing. In addition, in the case of travelling with contact as shown in FIG. 2b, the melted metal 8 is scattered out of the arc 4 in the form of fine drops 9 by tearing away the melted metal at the decontacting step, and a similar phenomenon is found in the case of the discharge of gas from the pool of melted metal 5.

In all cases, the scattered fine drops 9 or spatter are deposited upon the end of the nozzle and upon the bead, which of course deteriorates the appearance of the latter, and the flow of the shielding gas 7 is disturbed so as to impart inferior welding results. In severe cases, the feed of the welding rod 1 is stopped. Accordingly, it is necessary to clean around the contact chip during the welding operation and consequently, continuous operation has not been achieved.

FIG. 3 shows a torch used within a conventional T I G welding operation wherein a non-consumable electrode 10 having a high melting point, such as, for example, tungsten, is used as the electrode and the arc 4 is ignited between the electrode and the base metal or substrate 3. During the operation, an inert gas 7, such as, for example, argon, is fed from within the shielding nozzle 6 as a shielding gas in order to protect the molten pool 5 from the atmosphere, and the welding can also be carried out by inserting a welding rod between the electrode 10 and the substrate 3.

Within such method, however, the electrode 10 is not protected whereby the end of the electrode 10 is polluted by means of the spatter of the molten pool 5, the metal vapor, and the scatter of fine drops of the welding rod during a long continuous operation. Accordingly, it is necessary to grind the end of the electrode with a grinder. If the grinding operation is neglected, a stable arc cannot be maintained and the consumption of the electrode is accelerated. Accordingly, it is necessary to closely observe the condition of the end of the electrode, and therefore continuous operation has been difficult.

It is additionally noted that the arc 4 is surrounded by the shielding gas 7 but is not guided thereby and consequently the arc is not restricted or constricted so as to be maintained the same in the direction of the electrode, the arc 4 therefore being somewhat movable, whereby a tortuous bead has been formed. These phenomena have been easily caused by pollution of the electrode 10 and it is necessary to control the welding condition from this viewpoint. Still further, when the composition of the steel contains large amounts of gaseous components, a large amount of gas has been discharged from the molten pool 5 upon solidification so as to form or produce welding defects 11, such as, for example, blow holes within the welded part.

SUMMARY OF THE INVENTION

Accordingly, it is an object of the present invention to provide an improved arc welding apparatus.

Another object of the present invention is to provide an improved arc welding process which will overcome the aforenoted disadvantages.

Still another object of the present invention is to provide an improved arc welding apparatus wherein the electrode is protected.

Yet another object of the present invention is to provide an improved arc welding apparatus wherein good arc directivity is obtained and maintained.

A further object of the present invention is to provide an improved arc welding apparatus and method wherein the formation of welding defects is prevented by utilizing a metallurgical reaction characteristic of a carbon dioxide arc welding operation.

The foregoing objectives are achieved according to the present invention through the provision of arc welding apparatus which includes a guide nozzle surrounding a non-consumable electrode so as to feed an inert gas about the electrode for protecting the electrode, and a shielding nozzle disposed outside the guide nozzle so as to feed carbon dioxide gas or a mixture of carbon dioxide with oxygen or other inert gas about the arc being formed as a shielding gas therefor. A welding rod containing a deoxidizer can be used to perform a deoxidizing reaction with the melted metal and oxygen from the shielding gas.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENTS

Figure 1:
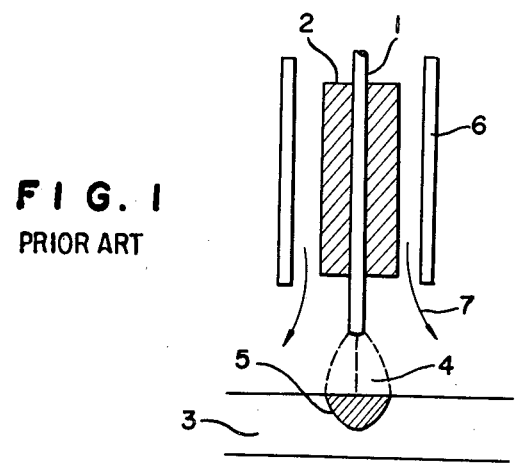
FIG. 1 is a schematic view of a conventional carbon dioxide arc welding apparatus.
Figure 2:
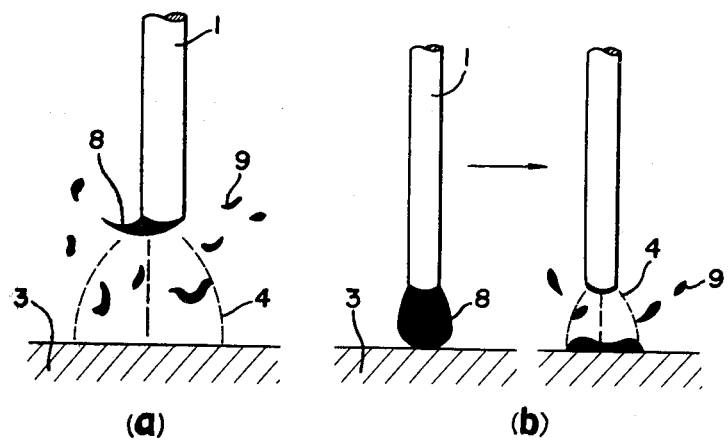
FIGS. 2a and 2b are schematic views of spatter.
Figure 3:
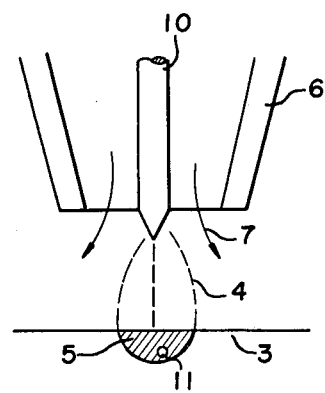
FIG. 3 is a schematic view of a conventional T I G welding apparatus.
Figure 4:
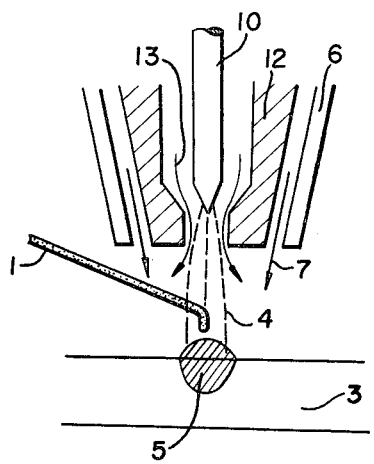
FIG. 4 is a schematic view of one embodiment of an arc welding apparatus constructed in accordance with the present invention and showing its cooperative parts.

Referring now to the drawings and more particularly to FIG. 4 thereof, there is shown one embodiment of an arc welding apparatus constructed in accordance with the present invention, wherein a non-consumable electrode 10 is protected by means of a surrounding guide nozzle 12 and an electrode protecting gas 13, preferably an inert gas, such as, for example, argon, which is supplied about electrode 10 from within nozzle 12, the arc therefore exhibiting excellent directivity. As shown, the nozzle 12 extends axially beyond the end of the electrode 10 and preferably has a conical exterior, having an ever-decreasing diameter in the direction of the end facing the base metal 3, and an interior wall providing an annular space between such interior wall and the electrode 10 for supplying the protective gas 13 about the electrode, with the end portion tapering inwardly toward its center adjacent the electrode end, whereby the protecting gas converges inwardly toward the electrode end as it emerges from the nozzle. Carbon dioxide gas, or a mixture of carbon dioxide and oxygen or other inert gas, is also supplied as a shielding gas 7 from a tapering annular space defined between a shield nozzle 6 concentrically disposed about guide nozzle 12, the shielding gas 7 being fed so as to surround arc 4. Accordingly, the outer portion of the arc is cooled whereby the radial extent of the arc 4 is restricted and constricted by means of the thermal pinch effect, and the secondary effects of the increases in the energy density and directivity are imparted thereto and obtained.

A welding rod 1 is shown being disposed between electrode 10 and a substrate or base metal 3 and the metallurgical reaction is performed within a melted metal pond or molten pool 5 of the base metal whereby an excellent bead exhibiting no blow holes is obtained. When the welding is carried out under small or low heating conditions, it is possible to perform the welding without using the welding rod 1. Within FIG. 4, no electrical power is shown being supplied to welding rod 1; however, it is clear that the amount of welded metal will be increased by applying a voltage potential between welding rod 1 and substrate 3 so as to effectively utilize the Joules heating effect which results by passing a current through the welding rod 1. One example of the contents of the deoxidizing agents or deoxidizers remaining within the bead which is formed by utilizing the apparatus of the present invention is as follows:

|  |  | Mn(%) | Si(%) |
| --- | --- | --- | --- |
| Content in welding rod |  | 1.45 | 0.70 |
| Content in welded metal | 100% argon shield | 1.43 | 0.68 |
|  | 100% $CO_2$ shield | 0.94 | 0.32 |

As is clear from the table, the resulting welded metal derived by utilizing the apparatus of the present invention exhibits excellent deoxidized characteristics.

Figure 5A:
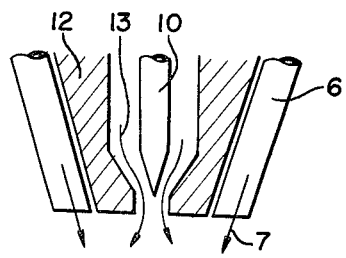
FIGS. 5a and 5b are schematic views of another embodiment of the present invention wherein the direction of feeding the shielding gas is within a plane which lies perpendicular to the travelling direction of the welding apparatus.
Figure 5B:
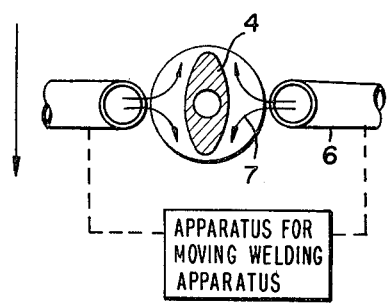

Referring now to FIG. 5, there is shown another embodiment of the present invention wherein pipe or tubular type shielding nozzles 6 are diametrically disposed about guide nozzle 12 within a plane which is perpendicular to the travelling direction of the welding apparatus, which apparatus is moved in a predetermined direction by suitable moving means, schematically shown, whereby the arc 4 being provided has an elliptical configuration, the major axis of which coincides with the travelling direction of the welding apparatus. Such distribution of the heat source with respect to the travelling direction of the apparatus imparts a preheating effect which increases the welding efficiency and whereby further, the disadvantage of undercuts, caused under high speed conditions, can be decreased.

Figure 6:
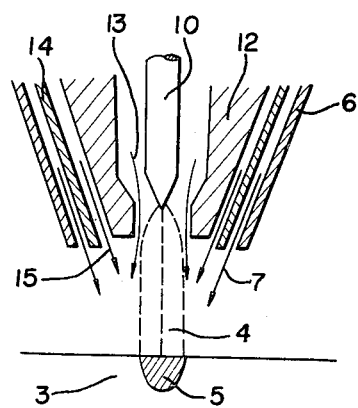
FIG. 6 is a schematic view of still another embodiment of the present invention having a nozzle for protecting the guide nozzle.

Referring to FIG. 6, still another embodiment of the present invention is illustrated wherein a tapered or conical protecting nozzle 14 for protecting the guide nozzle 12 is interposed concentrically between the guide nozzle 12 and the shield nozzle 6. Heretofore, it has been known that a series arc is generated in parallel relationship with respect to the arc 4 between the electrode 10, the guide nozzle 12, and the base metal or substrate 3, by depositing an oxide, metal vapor or the like at the lower end of the guide nozzle 12. When such a series arc is generated, the guide nozzle 12 is damaged and the arc condition is rendered unstable, which causes inferior beads.

Such disadvantageous phenomena can be prevented by maintaining the lower end surface of the guide nozzle 12 clean. In accordance with this embodiment of the present invention, an inert gas 15, such as, for example, argon, is passed between the guide nozzle 12 and the protecting nozzle 14, whereby the guide nozzle 12 is protected and the generation of the series arc is prevented, so as to continuously utilize the apparatus ion long periods of time.

Figure 7:
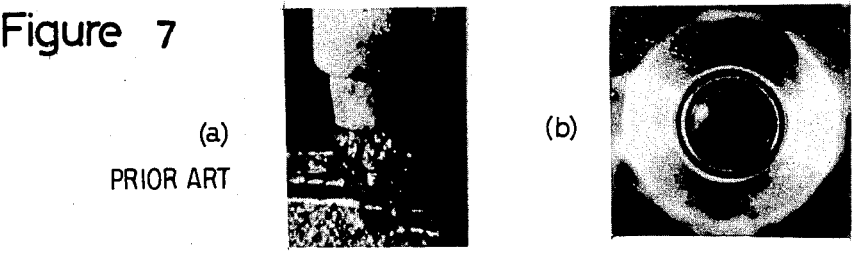
FIGS. 7a and 7b are photographs of a conventional welding apparatus and the apparatus of the present invention, respectively.

FIG. 7 shows photographs of the conditions of such nozzles after long periods of continuous operation, FIG. 7a showing the condition of a shielding nozzle and the contact chip depositing spatter within a conventional arc welding apparatus within which carbon dioxide gas was utilized. The welding operation cannot continue under such conditions and, accordingly, the deposited matter must be periodically removed and such, of course, requires a substantial amount of manual work and time lost from production. To the contrary, FIG. 7b shows the condition of the nozzle of the apparatus of the present invention, the apparatus having been used for the same period of time as that of the apparatus of FIG. 7a; however, no deposition of spatter is found, and the apparatus of the present invention is thus suitable for long continuous operation, and according to the welding operation of the present invention, the consumption of the electrode has been remarkably decreased with respect to that of a conventional T I G welding operation.

Figure 8:
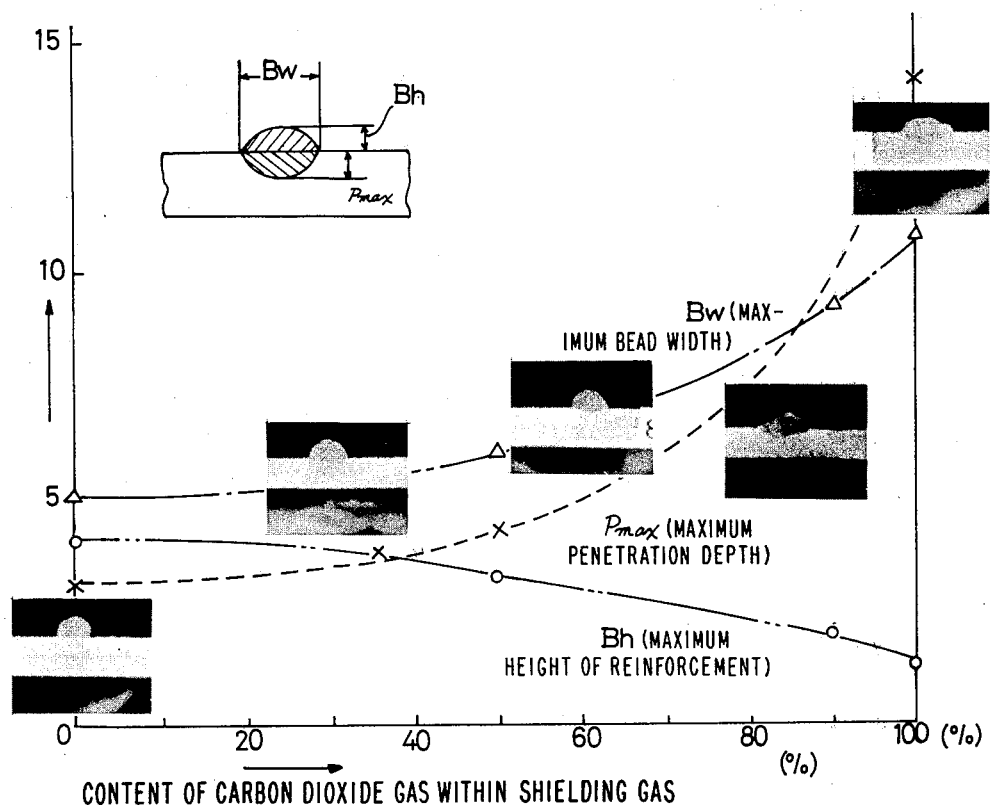
FIG. 8 is a plot having superimposed sectional views of welded beads formed by the embodiments of the present invention and illustrating the dependence upon the carbon dioxide gas contents within the shielding gas so as to effect the bead configurations.

Turning to FIG. 8, there is shown sectional views of beads which have resulted because of utilizing the apparatus of the present invention, while altering the content of carbon dioxide within the shielding gas. The reference $B_w$ designates the curve of maximum width of the bead, while $P_{max}$ designates the curve of maximum penetration depth thereof and $B_h$ designates the curve of maximum height of reinforcement. One example of the welding condition is as follows:

| | |
|---|---|
| welding current | 200 (A); |
| welding voltage | 35 (V); |
| welding velocity | 20 (cm/min); |
| Gas for protecting non-consumable electrode and flow rate | argon gas 1 (l/min); |
| diameter of protecting nozzle | 5 mm; |
| electrode | thorium containing tungsten 3 mm diameter; |
| substrate | mild steel SS-41 6 mm thickness; |
| welding flux rod | welding rod for $CO_2$ gas are welding 1.2 mm diameter; |
| feeding rate of welding rod | 2.7 (m/min) |

Figure 9:
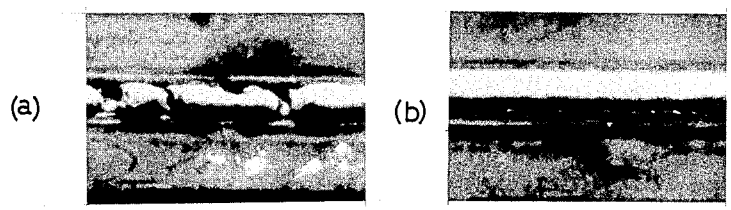
FIGS. 9a and 9b are photographs of welded beds formed by the embodiments of the present invention utilizing different amounts of carbon dioxide gas.

As is clear from FIG. 8, the maximum width $B_w$ of the bead, the maximum penetration depth $P_{max}$ and the maximum height of reinforcement $B_h$ decrease with a concomitant increase in the content of carbon dioxide gas. When the content of the carbon dioxide gas within the shielding gas is zero per cent, the appearance of the bead is deformed so as to have a bump configuration, as shown within FIG. 9a; however, when a small amount of carbon dioxide gas is mixed within the shielding gas, an excellent appearance of the bead is obtained, as shown in FIG. 9b. The effect of the carbon dioxide gas is thus quite clear and consequently it is additionally apparent that the configuration of the melted part can be controlled by properly selecting the content of the carbon dioxide gas within the shielding gas. In any case, the formation of spatter caused by the welding rod has not been observed. Moreover, it should be noted that the above-indicated welding results are due to the combination of lateral wire feed and carbon dioxide shielding gas.

Thus, it may be seen that in accordance with the present invention, consumption of the electrode is prevented by protecting the electrode and an excellent bead is obtained as a result of the desirable deoxidizing effect of carbon dioxide and the deoxidizing agent within the welding rod, the apparatus of the present invention thereby providing excellent effects for long and continuous automatic welding operations.

Obviously, many modifications and variations of the present invention are possible in light of the above teachings. It is to be understood, therefore, that within the scope of the appended claims the present invention may be practiced otherwise than as specifically described herein.

What is claimed as new and desired to be secured by Letters Patent of the United States is:

1. An arc welding apparatus for use in welding a base metal, which comprises:
    a non-consumable electrode for generating an arc to said base metal;
    a guide nozzle surrounding said non-consumable electrode, said guide nozzle extending axially beyond said electrode such that said electrode is disposed within said guide nozzle in an axially recessed position;
    a shielding nozzle disposed outside said guide nozzle;
    means continuously feeding an inert gas between said guide nozzle and said electrode as a protecting gas for said non-consumable electrode and feeding carbon dioxide gas or a mixture of carbon dioxide gas with oxygen or carbon dioxide gas with inert gas from said shielding nozzle as a shielding gas; and
    a welding rod containing a deoxidizer laterally interposed between an end of said non-consumable electrode and said base metal; whereby
    a deoxidizing reaction with a pool of melted base metal is effectively promoted between said carbon dioxide gas in said shielding gas and said deoxidizer.

2. Arc welding apparatus as set forth in claim 1, wherein:
    said shielding nozzle is disposed substantially concentrically about said guide nozzle.

3. Arc welding apparatus for use in welding a base metal which comprises:
    a non-consumable electrode for generating an arc to said base metal;
    a welding rod containing a deoxidizer laterally interposed between an end of said non-consumable electrode and said base metal;
    a guide nozzle surrounding said non-consumable electrode, said guide nozzle extending axially beyond said electrode such that said electrode is disposed within said guide nozzle in an axially recessed position;

a shielding nozzle disposed outside said guide nozzle;

means continuously feeding an inert gas between said guide nozzle and said electrode as a protecting gas for said non-consumable electrode and feeding carbon dioxide gas or a mixture of carbon dioxide gas with oxygen or carbon dioxide gas with inert gas from said shielding nozzle as a shielding gas; and, means for moving said welding apparatus in a predetermined direction of travel wherein said shielding nozzle comprises means for forming said arc in an elliptical configuration, the major axis of which coincides with said predetermined direction of travel comprising at least one pair of pipe type nozzles which are diametrically disposed upon opposite sides of said guide nozzle and lie within a plane which is perpendicular to the direction of movement of said welding apparatus.

4. Arc welding apparatus for use in welding a base metal, which comprises:

a non-consumable electrode for generating an arc to said base metal;

a welding rod containing a deoxidizer laterally interposed between an end of said non-consumable electrode and said base metal;

a guide nozzle surrounding said non-consumable electrode, said guide nozzle extending axially beyond said electrode such that said electrode is disposed within said guide nozzle in an axially recessed position;

a shielding nozzle disposed outside said guide nozzle;

means continuously feeding an inert gas between said guide nozzle and said electrode as a protecting gas for said non-consumable electrode and feeding carbon dioxide gas or a mixture of carbon dioxide gas with oxygen or carbon dioxide gas with inert gas from said shielding nozzle as a shielding gas; and, a protecting nozzle for protecting said guide nozzle interposed between said shielding nozzle and said guide nozzle and means for continuously passing an inert gas between said protecting nozzle and said guide nozzle so as to maintain a clean lower surface on said guide nozzle.

5. An arc welding method comprising the steps of:

disposing a non-consumable electrode within a guide nozzle such that said electrode is axially recessed within said nozzle;

creating an arc between said non-consumable electrode and a base metal;

continuously surrounding said non-consumable electrode with an inert gas fed from said guide nozzle;

shielding said arc and restricting the radial extent thereof by feeding a shielding gas having carbon dioxide therein outside the periphery of said arc and said inert gas; and laterally feeding a deoxidizer in the vicinity of the arc for causing a deoxidizing reaction for the melted metal, generated from said base metal, and shielding gas.

6. An arc welding method as set forth in claim 5, wherein said shielding gas is fed in surrounding relation about said arc.

7. An arc welding method comprising the steps of:

disposing a non-consumable electrode within a guide nozzle such that said electrode is axially recessed within said nozzle;

creating an arc between said non-consumable electrode and a base metal;

laterally interposing a welding rod containing a deoxidizer between an end of said non-consumable electrode and said base metal;

continuously surrounding said non-consumable electrode with an inert gas fed from said guide nozzles; and, shielding said arc and restricting the radial extent thereof by feeding a shield gas having carbon dioxide therein outside the periphery of said arc and said inert gas including feeding said shielding gas from opposing diametrical sides of said arc so as to form an arc of elliptical configuration.

8. An arc welding method comprising the steps of:

disposing a non-consumable electrode within a guide nozzle such that said electrode is axially recessed within said nozzle;

creating an arc between said non-consumable electrode and a base metal;

laterally interposing a welding rod containing a deoxidizer between one end of said non-consumable electrode and said base metal;

continuously surrounding said non-consumable electrode with an inert gas fed from said guide nozzle;

shielding said arc and restricting the radial extent thereof by feeding a shielding gas having carbon dioxide therein outside the periphery of said arc and said inert gas; and passing an inert gas between inert gas fed from said guide nozzle and said shielding gas so as to maintain a clean lower end surface on said guide nozzle.

* * * * *